United States Patent
Song et al.

(10) Patent No.: US 10,137,773 B1
(45) Date of Patent: Nov. 27, 2018

(54) NON-LINEAR SPRING MECHANISM

(71) Applicant: Ford Global Technologies, LLC, Dearborn, MI (US)

(72) Inventors: Xiankai Song, Canton, MI (US); Michael Terrence Zitkovic, Jr., Dearborn, MI (US)

(73) Assignee: Ford Global Technologis, LLC, Dearborn, MI (US)

( * ) Notice: Subject to any disclaimer, the term of this patent is extended or adjusted under 35 U.S.C. 154(b) by 0 days.

(21) Appl. No.: 15/585,650

(22) Filed: May 3, 2017

(51) Int. Cl.
B60K 15/05 (2006.01)

(52) U.S. Cl.
CPC ........ B60K 15/05 (2013.01); *B60K 2015/053* (2013.01); *B60K 2015/0553* (2013.01)

(58) Field of Classification Search
CPC ............ B60K 15/05; B60K 2015/0553; B60K 2015/053
See application file for complete search history.

(56) References Cited

U.S. PATENT DOCUMENTS

| | | | | |
|---|---|---|---|---|
| 4,971,382 A | * | 11/1990 | Ohno | B60K 15/05 16/291 |
| 5,435,358 A | * | 7/1995 | Kempka | B60K 15/04 141/312 |
| 5,906,406 A | * | 5/1999 | Pajakowski | B60K 15/05 220/86.2 |
| 6,446,826 B1 | * | 9/2002 | Foltz | B60K 15/04 220/203.01 |
| 6,752,448 B1 | * | 6/2004 | Hsu | B60K 15/05 220/86.2 |
| 6,755,057 B2 | * | 6/2004 | Foltz | B60K 15/04 141/312 |
| 7,566,089 B2 | | 7/2009 | Alfaro | |
| 8,151,837 B2 | | 4/2012 | Beier et al. | |
| 9,227,509 B1 | | 1/2016 | Jones | |
| 2005/0229360 A1 | | 10/2005 | Lowe | |
| 2008/0136210 A1 | * | 6/2008 | Scott | B60K 15/04 296/97.22 |
| 2010/0072774 A1 | * | 3/2010 | Bar | B60K 15/0406 296/97.22 |
| 2018/0079296 A1 | * | 3/2018 | Wakao | B60K 15/04 |

FOREIGN PATENT DOCUMENTS

EP      0649965 A1    4/1995

* cited by examiner

*Primary Examiner* — Nicolas A Arnett
(74) *Attorney, Agent, or Firm* — Julia Voutyras; McCoy Russell LLP

(57) ABSTRACT

Methods and systems are provided for a non-linear spring mechanism coupled to a cover element. As an example, a system may comprise: a bar linkage mechanism having a first spring arm coupled to a second pivotable spring arm via a living spring hinge, the second pivotable spring arm having a lower or an equivalent stiffness compared to the first spring arm; an element coupled to at least one of the arms of the bar linkage mechanism. In one example, the element may be a cover cap, swing door or a sliding door. In this way, the linkage mechanism may allow the element to open with ease while providing improved performance in corrosive environments.

10 Claims, 11 Drawing Sheets

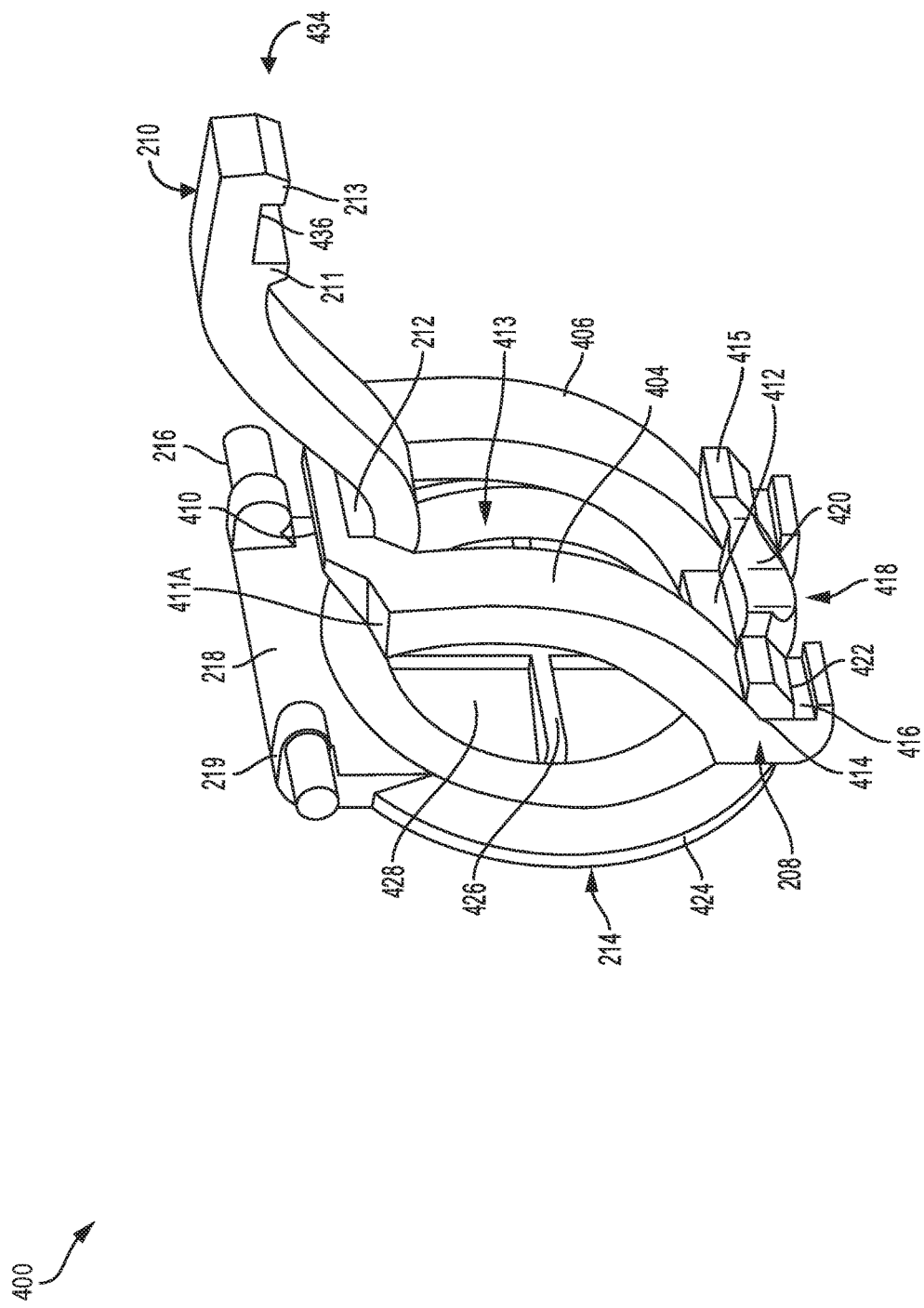

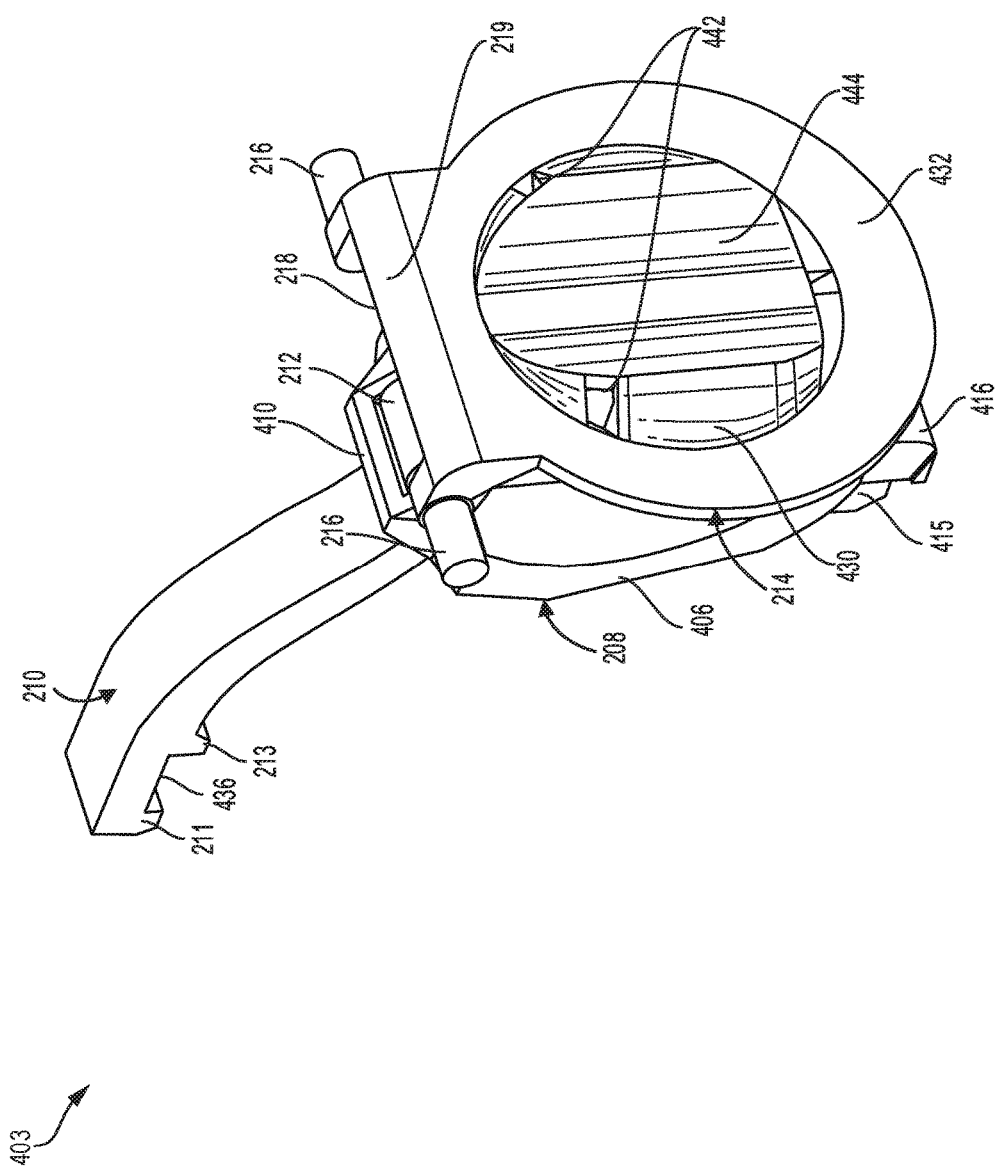

NON-LINEAR SPRING MECHANISM

FIELD

The present description relates generally to methods and systems for a non-linear spring mechanism coupled to a sealing door.

BACKGROUND/SUMMARY

Various types of spring mechanisms may be used for mounting various components to a larger system. For example, a body door may be mounted to a vehicle using a pivotable spring mechanism that allows the door to be adjusted between an open and a closed position. The pivotable spring mechanism may be configured with one or more arms coupled to the body door, each arm providing structural support, thereby allowing the door to open or close with ease. Still other elements may be coupled to one another via a spring, such as a lever, a flap, a handle, and still others.

In another example, a cover element may be mounted to a fuel chamber of a vehicle fluid port using a spring mechanism, which may be actuated by a fuel nozzle inserted into the chamber. Inserting the fuel nozzle in the fuel chamber, pushes the cover element inward into the chamber, to adjust the cover element from a closed position to an open position. When the cover element is adjusted to the open position, the nozzle positioned in the fuel chamber dispenses fuel into the fuel tank. In order to reduce the amount of fuel vapor released to the atmosphere, the cover element may be adjusted back to the closed position upon removal of the fuel nozzle from the fuel chamber.

One example of a cover element in a vehicle fueling device is shown by Beier in U.S. Pat. No. 8,151,837. Therein, the fueling device includes a valve body having a primary and a secondary access door, each door mounted within the valve body via a pivot and spring assembly. A locking mechanism is provided to selectively permit the primary access door to move from a closed position to an open position.

However, the inventors herein have recognized potential issues with such a system. As one example, the pivot and spring assembly may only provide a linear force-displacement response when any of the access doors are adjusted to open. In this case, a large applied force may be required if any of the access doors have a large sealing force. Further, the spring assembly attached to any of the access doors may be exposed to corrosive fluids that may degrade or reduce lifespan of the assembly.

In one example, the issues described above may be addressed by a system may comprise: a bar linkage mechanism having a first spring arm coupled to a second pivotable spring arm via a living spring hinge, the second pivotable spring arm having a lower stiffness compared to the first spring arm; an element coupled to at least one of the arms of the bar linkage mechanism. In this example, the element may be a cap, a swing door or a sliding door on the system. As a further, example, the system may be an engine fluid port, a thermal actuator or a hybrid charger mechanism. The bar linkage mechanism may be configured to adjust the element between a closed position and an open position.

The bar linkage mechanism may be used in a variety of contexts and may confer several advantages. For example, when the element is adjusted to open, the first spring arm and second pivotable spring arm of the linkage mechanism may bend to produce an adequate non-linear resistance force that allows the element to open with less applied force. Further, the linkage mechanism may be comprised of non-corrosive materials such as plastic that does not degrade in urea or other corrosive fuel additives. In this way, the linkage mechanism enables the element to open with less applied force while addressing performance issues in corrosive environments.

A further example may comprise: one spring arm having two curved members with a space there between so that the other spring arm is inserted between the spaces during closing of the element to provide the advantage of reducing protrusion of the element into a fluid port, for example, when the element is in the closed position. Further, one of the spring arms may include a plurality of tabs that snap into retention with slots in the system, thereby providing a simplified means of coupling the bar linkage mechanism to the system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4A shows a first view of the spring mechanism coupled to the cover element.

FIG. 4C shows a third view of the spring mechanism coupled to the cover element.

FIGS. 2-8 are shown approximately to scale, although other relative dimensions may be used, if desired.

DETAILED DESCRIPTION

Figure 2:
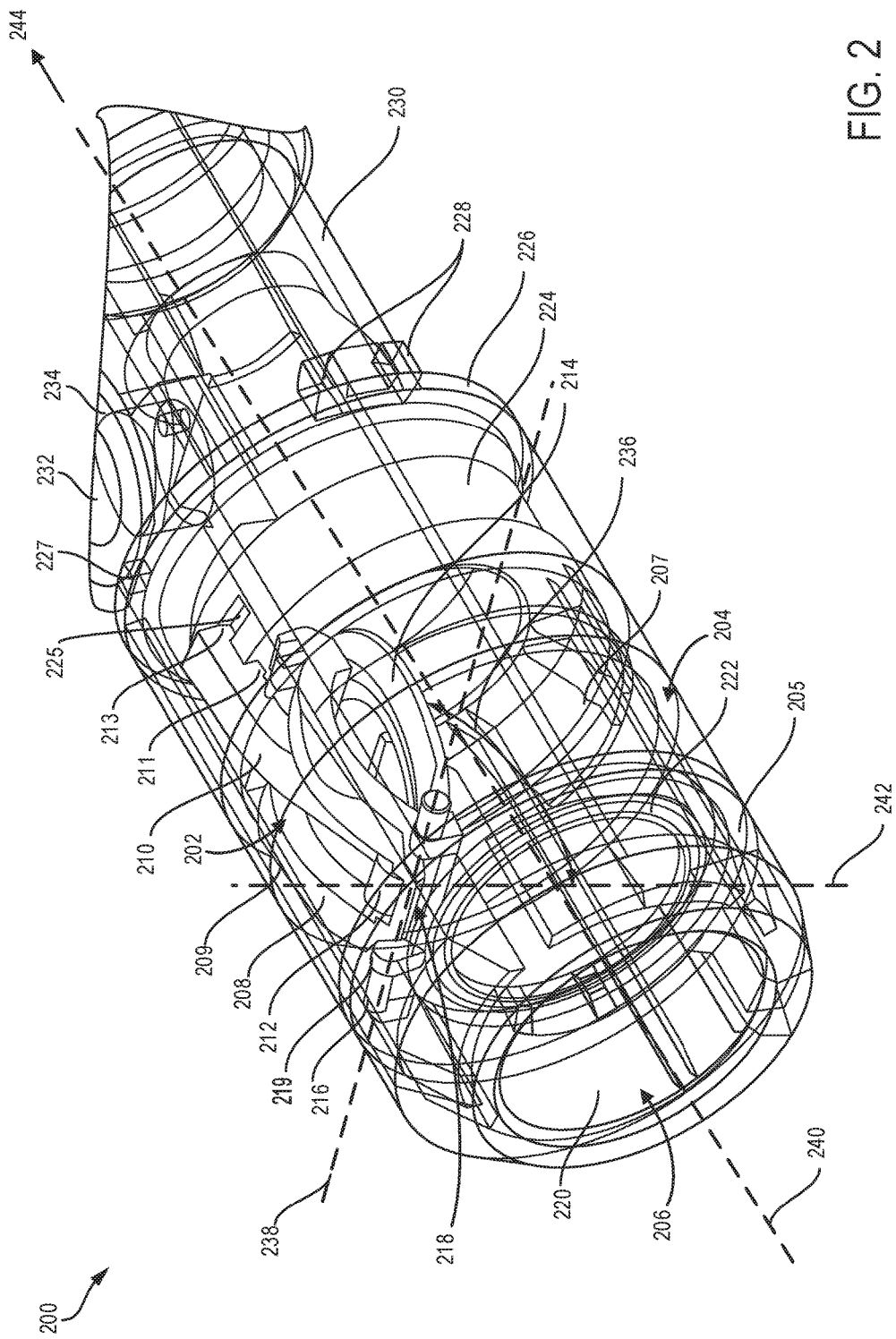
FIG. 2 shows a schematic depiction of a fluid port having a spring mechanism coupled to a cover element mounted to the port.
Figure 3:
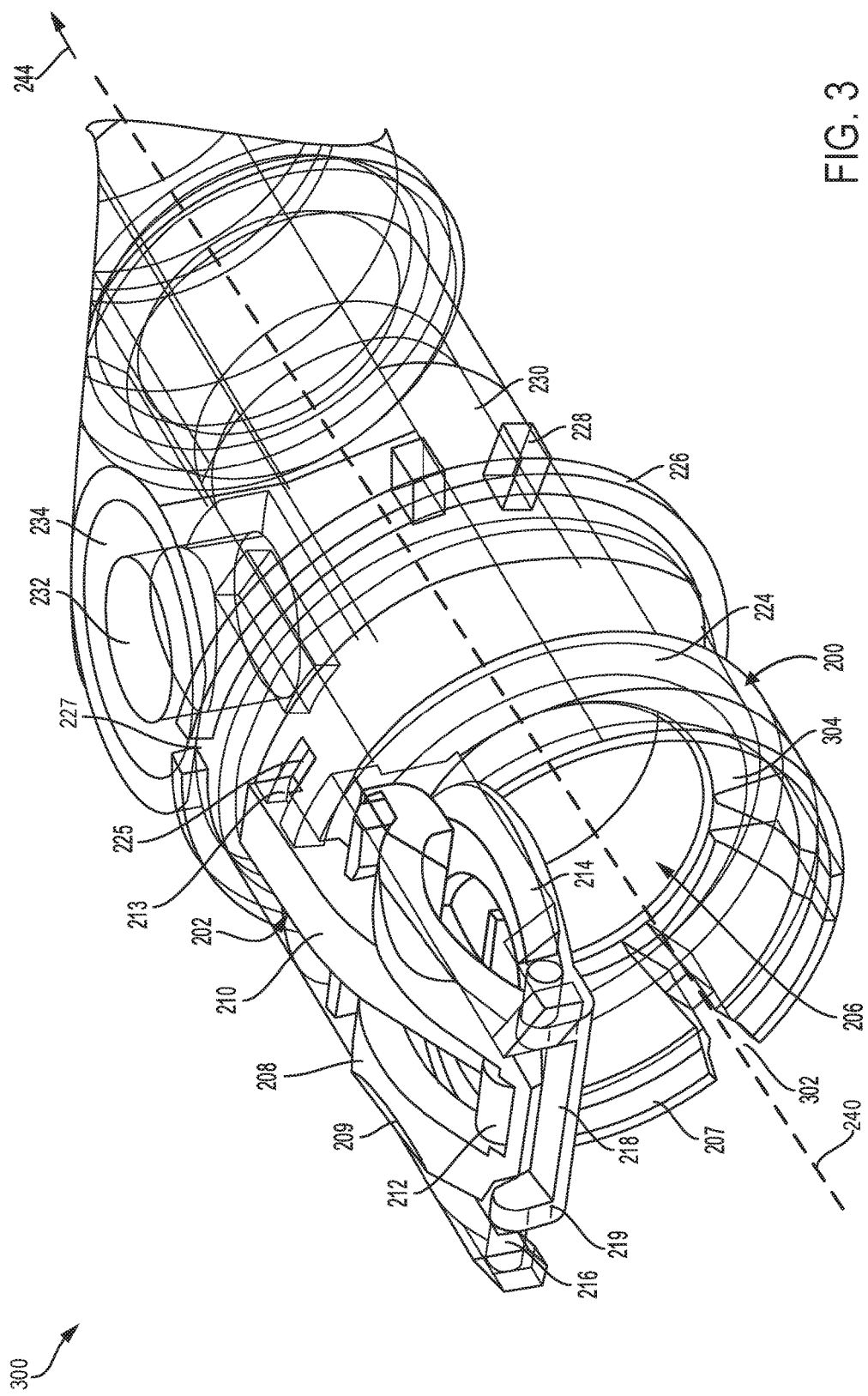
FIG. 3 shows a schematic depiction of the fluid port having the spring mechanism coupled to the cover element, with a front cap of the port removed.

The following description relates to a fluid port having a non-linear spring mechanism coupled to a sealing door of the port. The fluid port may be mounted to a vehicle, such as the vehicle shown in FIG. 1. For example, the fluid port may be included in a vehicle fueled with diesel, petrol or a suitable fuel blend such as a gasoline-ethanol fuel blend, etc. As shown in FIG. 2, the fluid port may be configured with a spring mechanism coupled to a cover element mounted downstream of a main opening of the port. In this case, the cover element may be a cap or a sealing door coupled to the spring mechanism. The cover element held in place by a plurality of hinges, may remain closed to seal off the fuel tank, and may be opened by inserting a fuel nozzle or a dispenser nozzle, such as a nozzle of a fuel dispensing device shown in FIG. 1. The spring mechanism which includes a pivotable spring arm and a fixed spring arm, may be adjustable between a first position (where the cover element is closed) to a second position, where the cover element is adjusted to an open position, as shown in FIGS. 2-3. The spring mechanism described herein may be used to mount or position one element relative to another, the elements taking various forms such as those noted herein.

Figure 4B:
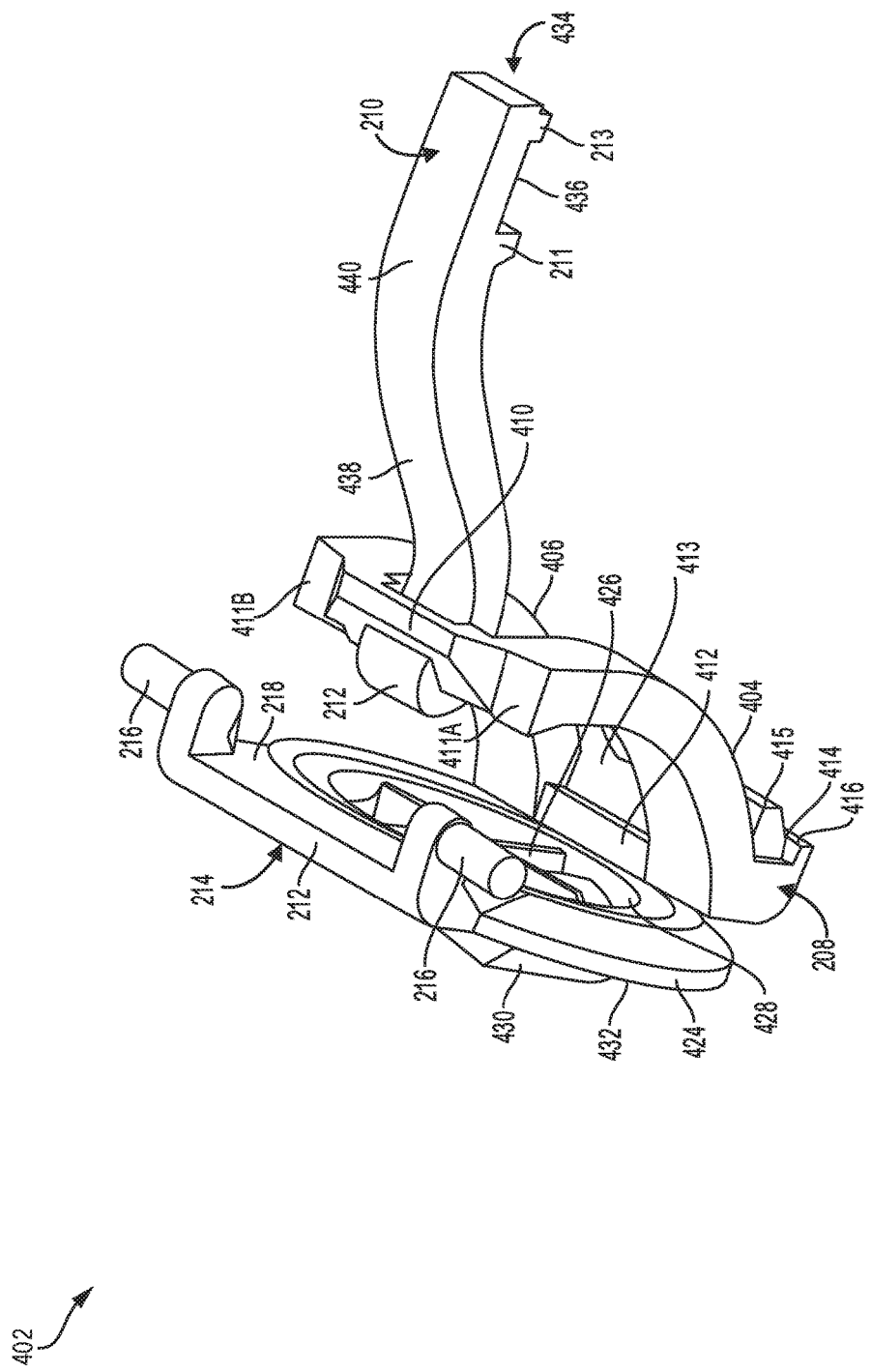
FIG. 4B shows a second view of the spring mechanism coupled to the cover element.
Figure 5:
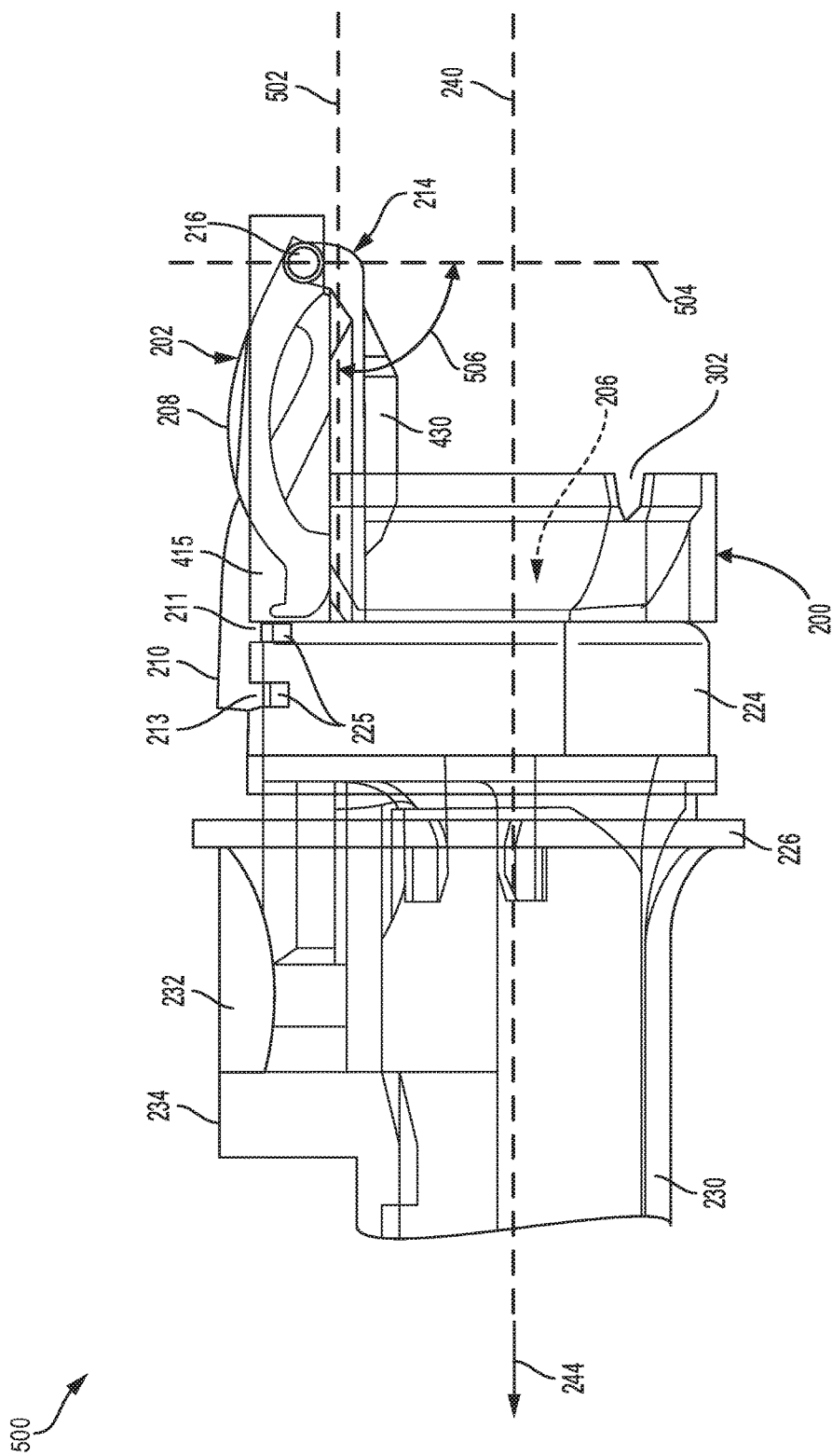
FIG. 5 shows a side view of the fluid port having the spring mechanism coupled to the cover element, with the front cap of the port removed.
Figure 6:
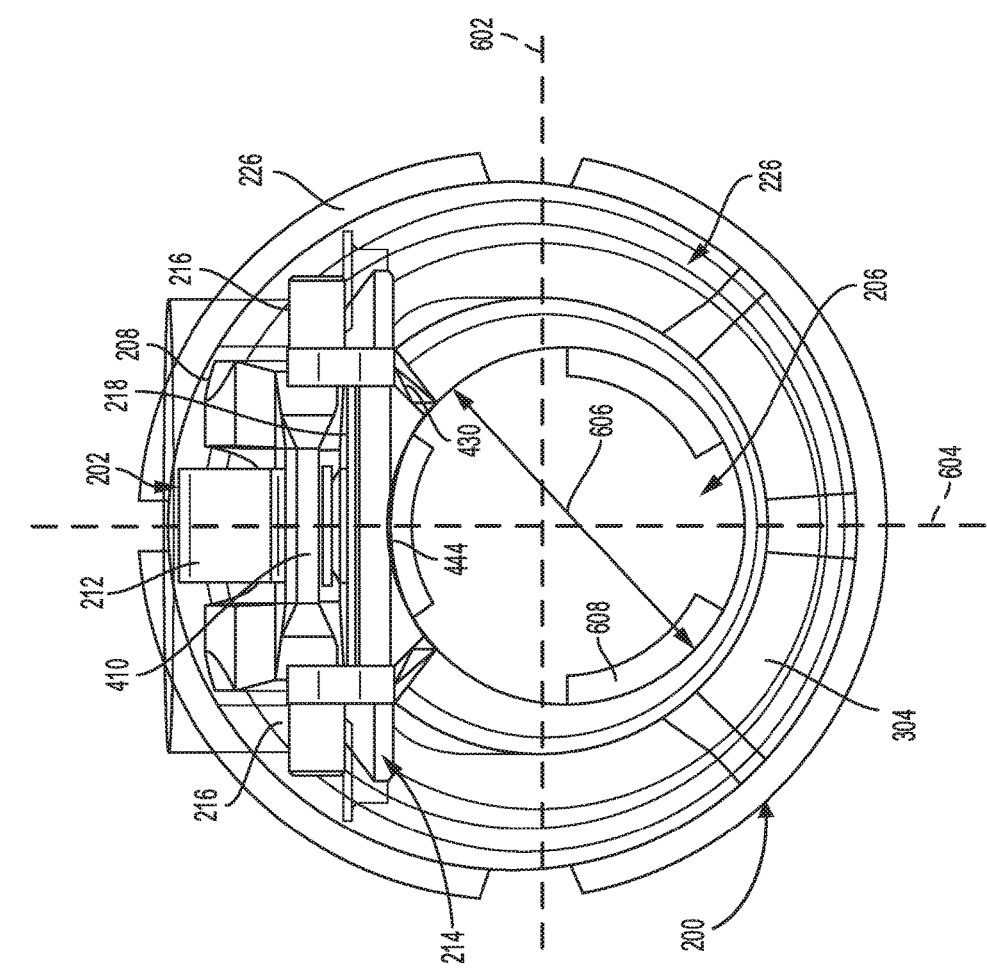
FIG. 6 shows a front view of the fluid port having the spring mechanism coupled to the cover element, with the front cap of the port removed.
Figure 7:
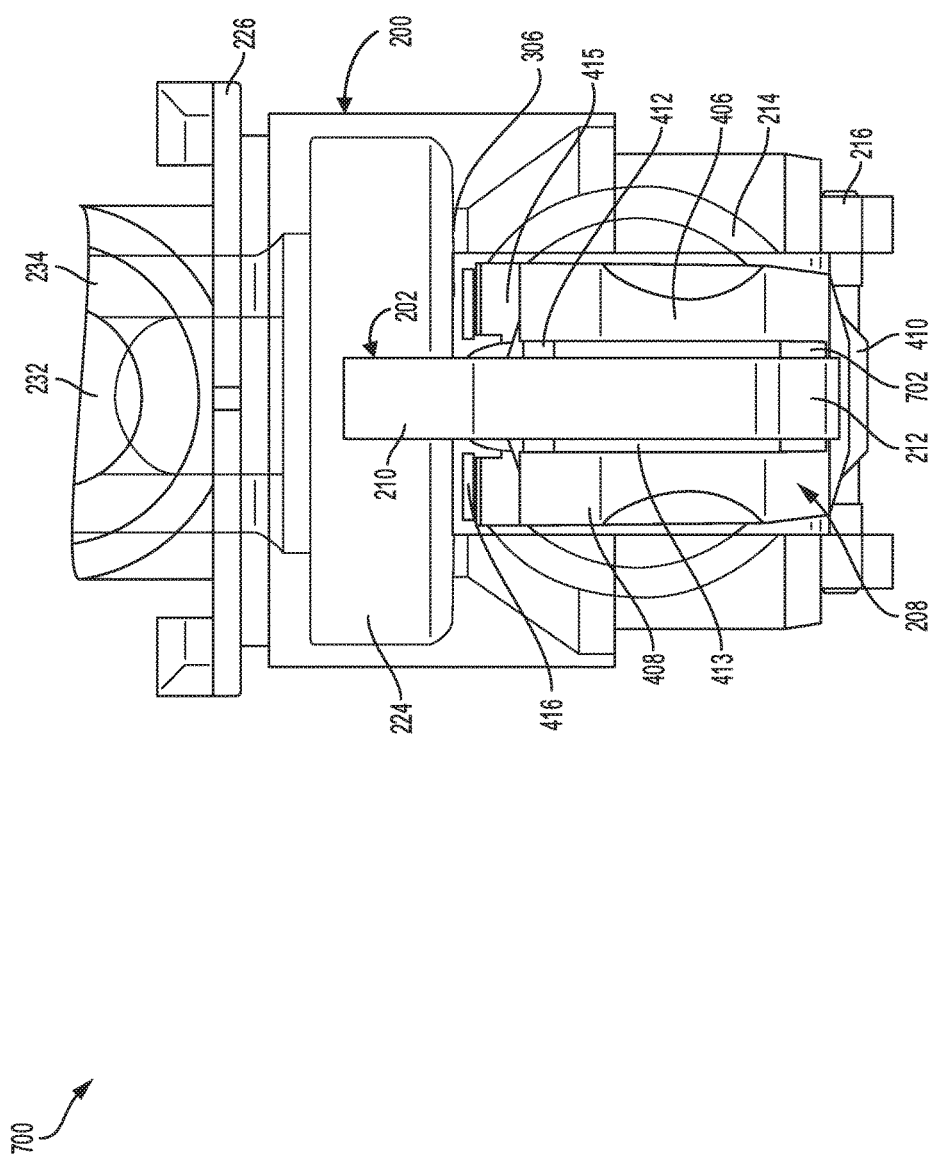
FIG. 7 shows a plan view of the fluid port having the spring mechanism coupled to the cover element, with the front cap of the port removed.

A first end of the pivotable spring arm may be coupled to the cover element, and a second end of the pivotable spring arm may be coupled to the fixed spring arm. When the fuel nozzle or dispenser nozzle in the fluid port is pushed forward into the main opening, the cover element may move from a closed position to an open position. When the cover element is adjusted to the open position, the fuel nozzle or dispenser nozzle may dispense fuel into the fuel tank. FIGS. 4A-4C show the pivotable and fixed spring arm of the spring mechanism, with the pivotable spring arm coupled to the cover element in the first position. The pivotable and fixed spring arms may move from the first position (when the cover element is in the closed position) to the second position, when the cover element is adjusted to the open position, as shown in FIGS. 5-7. The fixed spring arm may bend slightly while the moveable spring arm may bend substantially, both arms producing a resistance force that enables the cover element to open with ease. As an example, the spring mechanism may provide a non-linear resistance force that enables the cover element to move from the closed position to the open position with minimal applied force.

The pivotable and fixed spring arm of the spring mechanism may be comprised of plastic materials such as polyoxymethylene, glass filled olefins, glass filled nylons, thermoplastic elastomers etc. Alternatively, both the pivotable and fixed spring arms of the spring mechanism may be comprised of other suitable non-corrosive materials. In this way, the spring mechanism may be manufactured from materials that may withstand corrosive compounds such as urea and other corrosive fluids in the fluid port.

Figure 8:
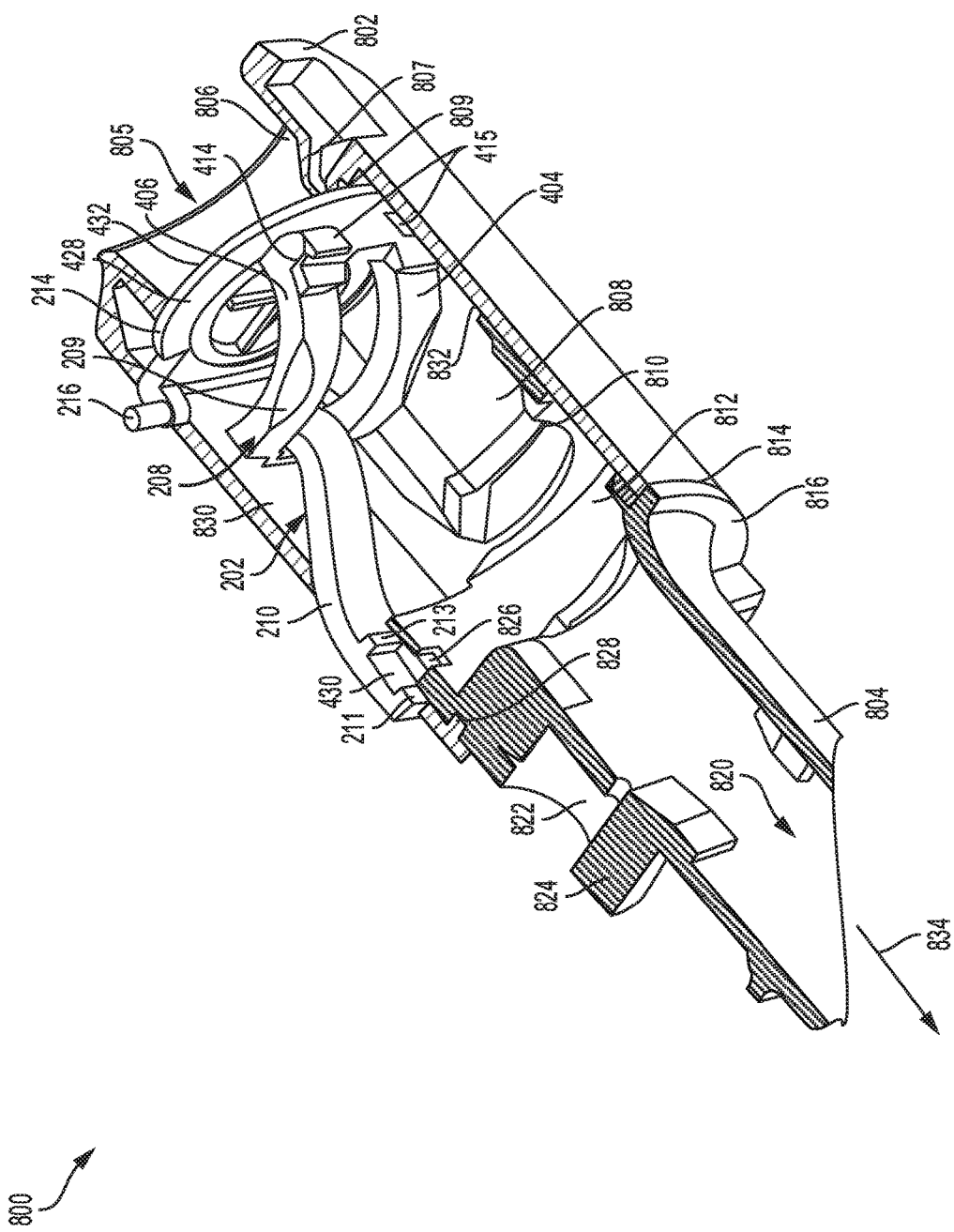
FIG. 8 shows a cross sectional view of an alternative embodiment of a fluid port having the spring mechanism coupled to the cover element.
Figure 9:
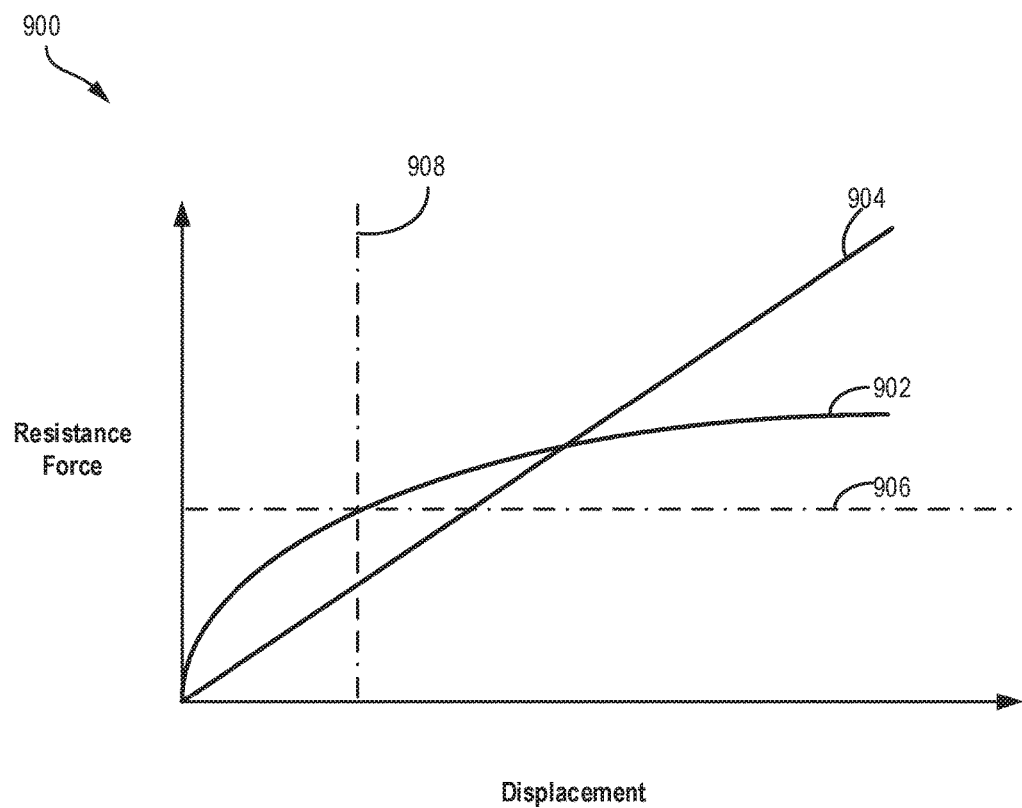
FIG. 9 shows an example graphic of a force displacement relationship for a spring mechanism and a regular spring coupled to a cover element.

FIG. 8 shows a second embodiment of the fueling port, with the spring mechanism coupled to the port and cover element in a closed position. The spring mechanism may be configured to allow the cover element to open with less applied force when the fuel nozzle or dispenser nozzle is inserted in the fluid port during refueling. As shown in FIG. 9, the spring mechanism may provide an adequate non-linear resistance force when the cover element is adjusted from the closed position to the open position. In a case, where a regular spring is attached to a cover element, a linear resistance force may be produced when the cover element is adjusted to the open position. The cover element having the regular spring, may require a large applied force to open the door, which may cause additional difficulty when refueling. By mounting the spring mechanism to the cover element of the fluid port, the cover element may be opened with ease due to an adequate non-linear resistance force produced when the pivotable and fixed spring arms of the spring mechanism bend or move from the first position to the second position.

Figure 1:
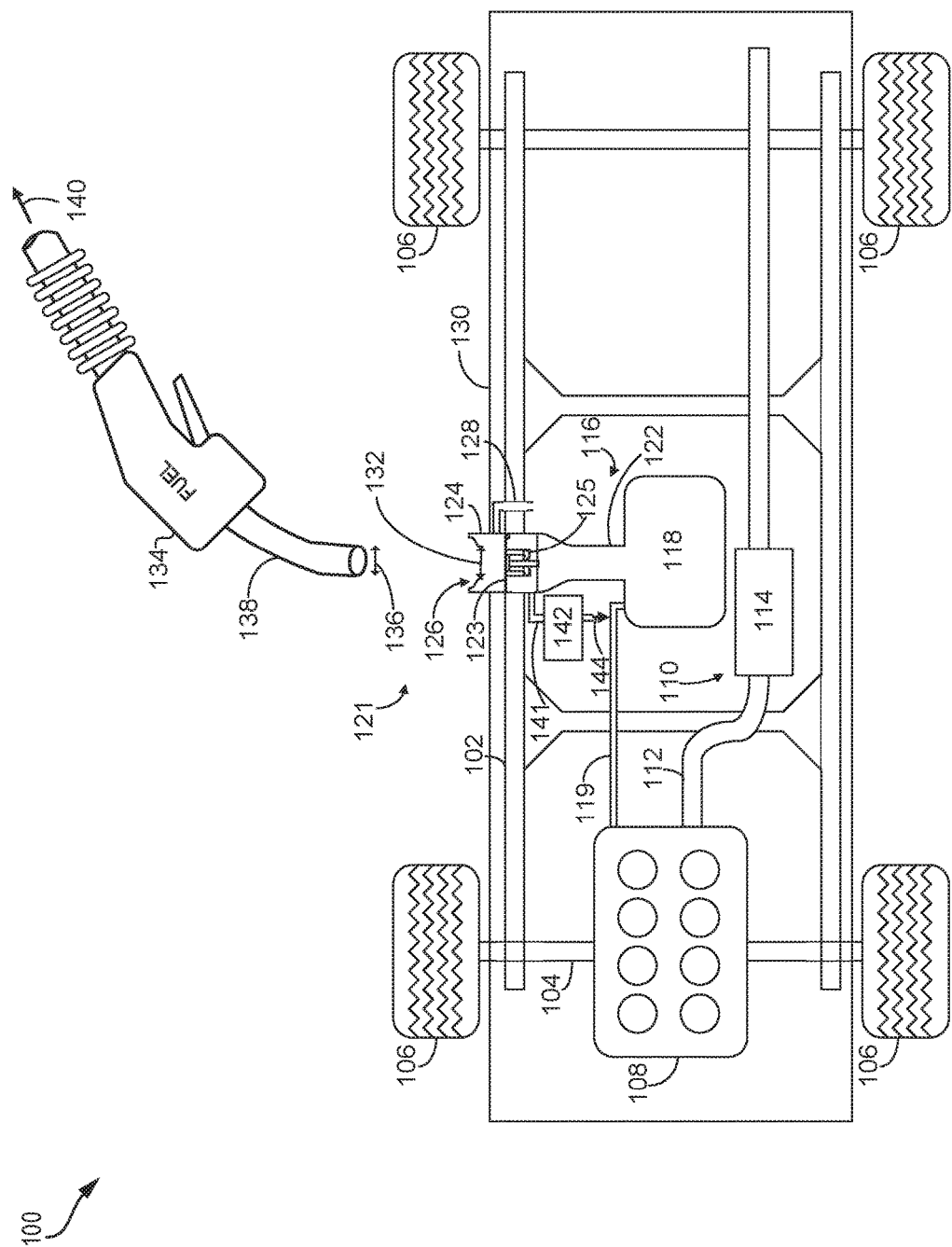
FIG. 1 shows a schematic depiction of a vehicle system with a fluid port.

Turning to FIG. 1, a schematic depiction of an example vehicle system 100 is disclosed. The vehicle system 100 may include a chassis 102, an axle 104 with wheels 106, and an engine 108, where the wheels may rest on the ground. The engine 108 may be a diesel engine in one example or a petrol or gasoline engine in other examples. The vehicle may include body sheet material, such as sheet metal, as shown herein. Further, although not shown, vehicle system 100 may further include a transmission, cab, or other components.

The vehicle system 100 may further include an exhaust system 110. The exhaust system may include an exhaust conduit 112 leading to one or more exhaust treatment devices, such as catalytic converter 114. Portions of the exhaust system, such as conduit 112, may be coupled to an exhaust manifold of the engine to flow exhaust gas from the exhaust manifold to the catalytic converter via conduit 112. Vehicle system 100 may further include a fuel system 116 with one or more fuel storage tanks 118 for storing fuel on-board the vehicle. For example, fuel tank 118 may store one or more liquid fuels, including gasoline, diesel, alcohol fuel blends etc. Fuel tank 118 may be coupled to engine 108 via a fuel delivery line 119 to deliver fuel to the engine.

A fuel filler passage 122 may be coupled to fuel tank 118 to direct fuel into the fuel tank during refueling. A fluid port 121 may be coupled to fuel filler passage 122. As described in more detail below, the fluid port 121 may include a nozzle chamber 124 with a nozzle stop 126, a cover element 123 and a drain tube 128. For example, the fluid port 121 may be a capless fueling device having a cover element actuated by a fuel nozzle. The nozzle chamber 124 may at least partially penetrate an outer surface 130 of vehicle 100 so that fuel may be replenished into the fuel tank via an external fuel source at a location shown by arrow 140. For example, fuel may be replenished in fuel tank 118 via fuel nozzle 138 at a refueling pump station. The fuel nozzle 138 may also be referred to as a dispenser nozzle, for dispensing fuel into the fluid port during a refilling operation. The nozzle stop 126 may be sized to prevent incorrectly-sized fuel nozzles or dispenser nozzles from opening the cover element 123 in the fluid port 121 in order to reduce occurrences of mis-fueling. For example, in a diesel engine, a nozzle stop may be configured to permit a standard-sized diesel fuel nozzle to open the fuel port and prevent a petrol fuel nozzle, which may be smaller than a diesel fuel nozzle, from opening the fuel port. As another example, in a petrol engine, a nozzle stop may be configured to permit a standard-sized petrol fuel nozzle to open the fuel port and prevent a diesel fuel nozzle from opening the fuel port.

The cover element 123 held in place by a pair of hinges, may remain closed to seal off the fuel tank, and may be opened by inserting a fuel nozzle or dispenser nozzle, such as nozzle 138 of fuel dispensing device 134, into the nozzle chamber 124. The cover element 123 may be coupled to a spring mechanism 125 having a pivotable spring arm coupled to a fixed spring arm. A first end of the pivotable spring arm may be coupled to the cover element, and a second end of the pivotable spring arm may be coupled to the fixed spring arm. When the fuel nozzle is inserted in the nozzle chamber 124, the cover element 123 may move from a closed position to an open position. The pivotable and fixed spring arms may move from a first position (when the door is in the closed position) to a second position, when the door is adjusted to the open position. The fixed spring arm may bend slightly while the moveable spring arm may bend substantially, both arms producing a resistance force that enables the cover element 123 to open with ease. As an example, the spring mechanism 125 may provide a non-linear resistance force that enables the cover element to move from the closed position to the open position with minimal applied force on the door.

A recirculation line 141 allows fuel vapor from the nozzle chamber to be conducted to a fuel canister 142 where the vapor may be stored and before being purged to the fuel system and/or engine intake during engine operation as shown by arrow 144, for example. The circulation line 141 is separate from and distinct from the drain tube 128. In particular, the recirculation line communicates directly with the vapor canister and regulates the flow of vapor in the system to help pull vapor into the canister. The drain tube 128 is open to atmosphere thus can, if not closed, allow air ingestion with what may be referred to as vapor recovery nozzles (particularly the vacuum assist versions that pull an artificial vacuum on the system by a station vacuum pump).

Turning to FIG. 2, a schematic depiction of a fluid port 200 having a spring mechanism 202 coupled to a cover element 214 mounted in an interior portion of a nozzle chamber 204, is disclosed. The spring mechanism 202 is shown with the cover element 214 adjusted to an open position. The spring mechanism 202 may include a pivotable spring arm 208 coupled to a fixed spring arm 210. Alternatively or optionally, the spring mechanism 202 may be referred to as a bar linkage mechanism, the fixed spring arm 210 may be referred to herein as a first spring arm, and the pivotable spring arm 208 may be referred to as a second spring arm. The nozzle chamber 204 may include a front cap 205 coupled to a rear cap 207, thereby forming a main opening 206 of the fluid port 200. As an example, the main opening 206 is fluidly coupled to an internal passage in a fuel filler tube 230 connected to the nozzle chamber 204. The internal passage in the fuel filler tube 230 leads to a fuel tank, positioned in a direction shown by arrow 244.

As shown in FIG. 2, the nozzle chamber 204 includes the main opening 206 having an internal wall 220. A circular ring 222, positioned downstream of an inlet of the main opening 206, is adapted to receive the cover element when the door is adjusted to a closed position. An annular cap 224 may be positioned in the nozzle chamber 204 at a downstream location from the circular ring 222. The annular cap 224 may include one or more slots 225 to receive a first tab 211 and a second tab 213 on the fixed spring arm 210. As an example, each of the first and second tabs 211-213 may snap into retention with the slots 225 on the fixed spring arm 210, thereby providing a means of anchoring the spring mechanism 202 to the fluid port 200. The nozzle chamber 204 may connect to filler tube 230 via a circular section 226 having an aperture 227 and a plurality of protruding portions 228. An annular portion 234 having an opening 232, may be coupled to a top portion of the filler tube 230.

The cover element 214 coupled to the spring mechanism 202, may be mounted to the nozzle chamber 204 via a pair of hinges 216 that snap into retention with recessed slots (not shown) in the fluid port 200. Further, a lower portion of the cover element 214 may be coupled to the pivotable spring arm 208 connected to the fixed spring arm 210. As an example, the lower portion of the cover element 214 may include a pair of protruding elements, each protruding element extending through a recessed slot (not shown) in a curved member of the pivotable spring arm 208. Each curved member of the pivotable spring arm 208 may include an indentation 209 that allows for easy packaging of the fixed spring arm within the fluid port 200. On end of the fixed spring arm 210 may be coupled to the pivotable spring arm 208 via a rod (not shown) that extends through a slot in a spring hinge 212 and an opening in each curved member of the pivotable spring arm 208. When coupled to the fixed spring arm 210, the pivotable spring arm 208 may translate through an angle 236 defined between a hinge axis 238 and a port axis 240.

When mounted to the nozzle chamber 204, the cover element 214 may be adjustable between the closed position and open position. The cover element 214 may be adjusted to open when a fuel nozzle or dispenser nozzle is inserted in the nozzle chamber 204 and extended through the main opening 206. The fuel nozzle or dispenser nozzle pushes the cover element 214 inward in the direction of arrow 244, thereby allowing the pivotable spring arm 208 to pivot about the spring hinge 212 and move from a first position (where the cover element 214 is in the closed position) to a second position, where the cover element is adjusted to the open position. The pivotable spring arm 208 may have a lower or an equivalent stiffness compared to the fixed spring arm 210, thereby allowing the pivotable spring arm to produce a larger bending moment compared to the fixed spring arm, when the spring mechanism 202 is adjusted from the first position to the second position. In this way, the pivotable spring arm 208 and fixed spring arm 210 may bend when moved from the first position to the second position, thereby producing an adequate non-linear resistance force that enables the cover element 214 to open with ease. When adjusted to the open door position, a front portion of the spring mechanism 202 may be positioned adjacent to an opening 218 on the cover element 214. The cover element 214 may be held in the open position by the fuel nozzle in the main opening 206 of the nozzle chamber 204.

The fuel nozzle may be removed from the nozzle chamber 204 after refueling, to allow the cover element 214 to move back to the closed position. When adjusted to the closed position, the cover element 214 seals tightly against the periphery of the circular ring 222. In this way, the cover element 214 closes off the main opening 206, to reduce or minimize flow of fuel vapor from the fluid port 200 to the atmosphere.

In this way, the fluid port 200 may comprise: a bar linkage mechanism 202 having a first spring arm 210 coupled to a second pivotable spring arm 208 via a spring hinge 212, the second pivotable spring arm 208 having a lower or an equivalent stiffness compared to the first spring arm 210; a cover element 214 pivotably coupled to the port and one of the arms of the bar linkage mechanism 202; and a filler tube 230 contiguously mounted to a main opening 206 of the port.

Referring to FIG. 3, a three dimensional view 300 of the fluid port 200 comprising the spring mechanism 202 coupled to the cover element 214, with the front cap removed is disclosed. The cover element 214 is shown in the open position, with the pivotable spring arm 208 and fixed spring arm 210 adjusted to provide an adequate resistance force that allows the door to open with less applied force. The rear cap 207 includes a plurality of slots 302 adequately sized to receive rib elements (not shown) on the front cap. The rib elements on the front cap may snap into retention with the slots 302 to securely fasten the rear cap 207 to the front cap.

When the cover element 214 is adjusted to open, the pivotable spring arm 208 may bend towards the fixed spring arm 210 to provide an adequate resistance force that allows the door to open with less applied force. As an example, the fixed spring arm 210 may have a higher stiffness compared to the pivotable spring arm 208, thereby allowing the fixed arm to bend less compared to the pivotable arm. In one example, the fixed spring arm 210 may produce a smaller bending moment compared to the pivotable spring arm 208, when the cover element 214 is adjusted to open. In this way, the both arms of the spring mechanism 202 may bend to produce a non-linear force that allows the cover element 214 to open with ease. When the cover element 214 is adjusted to the open position, a rear portion of the pivotable spring arm 208 and cover element 214 may be positioned adjacent to a top most section of an outer surface 304 of the annular cap 224. During refueling, the cover element 214 may provide adequate clearance for the fuel nozzle inserted in the main opening 206.

Referring to FIGS. 4A-4B, a first view 400 and a second view 402, respectively of the spring mechanism 202 coupled to the cover element 214 is disclosed. The spring mechanism 202 is shown with the cover element 214 adjusted to a closed position. The spring mechanism 202 may include the pivotable spring arm 208 coupled to the fixed spring arm 210 at the spring hinge 212. The pivotable spring arm 208 may include a first curved member 404, a second curved member 406 and cross members 410-412.

As shown in FIG. 4A, the first curved member 404 is connected to cross member 410 at a shoulder junction 411A. The cross member 410 is also connected to the second curved member 408 at a second shoulder junction 411B, as shown in FIG. 4B. The cross member 412 is connected to both the first curved member 404 and second curved member 408. In this way, each of the cross members 410-412 are connected to the first and second curved members 404-406 to form a single pivotable spring arm 208. As an example, each of the first and second curved members 404-406 may be convexly shaped. A recessed opening 418, formed between a bottom portion of cross member 412 and each of the first and second curved members 404-406, may be adequately sized to receive a protruding section 420 of the cover element 214. A recessed slot 414 formed in each of the first and second curved members 404-406 may be configured to receive a protruding element 415 of the protruding section 420. The recessed slot 414 in each curved member 404-406, may be formed in rear portion of each leg 416 of the curved members 404-406. When secured in each recessed slot 414, the protruding element 415 of the protruding section 420 may be in face-sharing contact with an inner wall of each leg 416 of the curved members 404-406 along contact interface 422. In this way, the cover element 214 may be securely coupled to the pivotable spring arm 208. When coupled to the pivotable spring arm 208, the cover element 214 may be adjustable between a closed position and an open position as disclosed earlier with reference to FIGS. 2-3.

The cover element 214 may include a circular outer portion 424, a plurality of rib elements 426 and a protruding portion 430, as shown in FIG. 4B. The plurality of rib elements 426 may be formed on an inner face 428 of the cover element 214 to provide rigidity. The cover element 214 may be coupled to the nozzle chamber in a fluid port (e.g., nozzle chamber 204 in fluid port 200 shown in FIG. 2) via the pair of hinges 216 that may extend into slots formed in an interior portion of the nozzle chamber. When coupled to the fueling port, the cover element 214 may pivot about hinge locations, thereby allowing the cover element to move between a closed position and an open position. The opening 218 on the cover element 214 may be adequately sized to receive a portion of the pivotable spring arm 208 and spring hinge 212, when the cover element is adjusted to the open position.

The fixed spring arm 210 is coupled to the pivotable spring arm 208 via the spring hinge 212 positioned within an aperture 413 formed between the first and second curved members 404-406. The spring hinge 212 allows the pivotable spring arm 208 to move from a first position (when the cover element 214 is adjusted to the closed position) to a second position (when the cover element 214 is adjusted to the open position). A distal end 434 of the fixed spring arm 210 may be coupled to a portion of the fueling port. A recessed slot 436 formed between the first tab 211 and a second tab 213 at the distal end 434 of the fixed spring arm 210, may be adequately sized to fit over a portion of a cap (such as annular cap 224 shown in FIGS. 2-3) positioned inside the nozzle chamber. The first and second tab 211-213 may be sized to snap into retention with slots on the cap (e.g., slots 225 on annular cap 224 shown in FIG. 3), to attach the fixed spring arm 210 to the fueling port. As shown in the FIG. 4B, the fixed spring arm 210 may include a curved portion 438 and a linear portion 440. As an example, the curved portion 438 may be a sloping portion that extends to the spring hinge 212 and the linear portion 440 may include tabs 211-213 and recessed slot 436. The moveable spring arm 208 and fixed spring arm 210 of the spring mechanism 202 may be comprised of plastic materials such as polyoxymethylene, glass filled olefins, glass filled nylons, thermoplastic elastomers etc. Alternatively, both the pivotable and fixed spring arms 208-210 of the spring mechanism 202 may be comprised of other non-corrosive materials. In this way, the spring mechanism 202 may be manufactured from materials that may withstand corrosive compounds such as urea and other corrosive fluids in the fueling port.

Referring to FIG. 4C, a third view 403 of the spring mechanism 202 coupled to the cover element 214 is disclosed. The cover element 214 includes a pair of openings 442 and a curved recessed slot 444 positioned between the protruding portion 430 on the outer face 432 of the door. As an example, the curved recessed slot 444 may be adequately sized to receive a fuel nozzle or dispenser nozzle adapted to move the cover element 214 from a closed position to an open position. In this way, the cover element 214 may be adjusted from the closed position to the open position, the spring mechanism 202 providing an adequate non-linear resistance force that allows the door to open with less applied force. When adjusted to the open position, the fuel nozzle or dispenser nozzle may dispense fuel into the fuel tank. Upon completion of refueling, the fuel nozzle may be removed from the fuel port to allow the cover element 214 to adjust back to the closed position.

The spring mechanism 202 may be used for mounting various types of cover elements to a larger system. For example, the cover element may be a body door mounted to a vehicle body using the spring mechanism 202, the door adjustable between an open and a closed position. In this case, the pivotable spring arm 208 coupled to the fixed spring arm 210 via a living spring hinge, may be coupled to the body door, each spring arm providing structural support to the door. Movement of the pivotable and fixed spring arms 208-210 allows the body door to open or close with less applied force.

In another example, the cover element may be a sliding door coupled to a thermal actuator via the pivotable spring arm 208 connected to the fixed spring arm 210 via the spring hinge of the spring mechanism 202. In this example, the sliding door may be slidably adjusted between a first position and a second position via movement of each spring arm 208-210. In this case, both spring arms 208-210 may bend to produce an adequate non-linear resistance force that allows the door to be adjusted from the first position to the second position. The pivotable spring arm 208 may have a lower or an equivalent stiffness compared to the fixed spring arm 210, thereby allowing the pivotable spring arm 208 to produce a greater bending moment compared to the fixed spring arm 210, when the sliding door is adjusted between the first and second position. In this way, the spring mechanism 202 may allow the sliding door of the thermal actuator to move between various positions with less applied force.

Referring to FIG. 5, a side view 500 of the fluid port 200 comprising the spring mechanism 202 coupled to the cover element 214, with the front cap removed is disclosed. The spring mechanism 202 is shown with the cover element 214 adjusted to the open position.

When in the open position, an inner face of the cover element 214 may be positioned along a cover axis 502. When a fuel nozzle or dispenser nozzle is inserted into the main opening 206, and extended along a port axis 240, the cover element 214 may be adjusted from the closed position to the open position. When positioned inside the main opening 206, the fuel nozzle may make face contact with a curved recessed slot (e.g., recessed slot 444 shown in FIG. 4C) on the cover element 214. A force applied to the fuel nozzle in the main opening 206 may move the cover element 214 from the closed position to the open position. The pivotable spring arm 208 and fixed spring arm 210 may move from a first position (when the door is in the closed position) to a second position (when the door is adjusted to the open position). As an example, the fixed spring arm 210 may have a lower or an equivalent stiffness (compared to the pivotable spring arm 208) which allows the fixed arm to produce a lower bending moment compared to a bending moment produced by the pivotable spring arm. In this case, the fixed spring arm 210 may bend slightly while the pivotable spring arm 208 may bend substantially, both arms producing a resistance force that enables the cover element 214 to open with less applied force on the cover element. As an example, the spring mechanism 202 may provide a non-linear resistance force that enables the cover element 214 to move from the closed position to the open position with minimal applied force.

When moved from the closed position to the open position, the cover element 214 may translate through an angle 506 formed between cover axis 502 and hinge axis 504. As an example, the angle 506 may range from 0-120 degrees. In one example, the cover element 214 is adjusted to the closed position when angle 506 is zero degrees. In another example, the cover element 214 is fully open when angle 506 is 120 degrees. In other examples, the cover element 214 may be adjusted to a position where the angle 506 has a value between 0 and 120 degrees. In this way, the cover element 214 may be adjusted through a wide range of positions, during and immediately after refueling.

Referring to FIG. 6, a front view 600 of the fluid port 200 comprising the spring mechanism 202 coupled to the cover element 214, with the front cap removed is disclosed. The spring mechanism 202 is shown with the cover element 214 adjusted to the closed position. A first port axis 602 divides the fluid port 200 into an upper and a lower section. The fluid port 200 may be symmetrically divided by a second port axis 604 into a first and a second side. When the cover element 214 is adjusted to the closed position, the spring mechanism 202 and cover element 214 may lie in the upper section of the fuel device.

The main opening 206 may have a diameter 606 adequately sized to receive a fuel nozzle for dispensing fuel into the fuel tank. As an example, the diameter 606 of the main opening 206 may be adequately sized to receive fuel nozzles with a wide range of nozzle diameters. In one example, the diameter 606 of the main opening 206 may range from 18.75 mm to 19.25 for a urea fluid port, 20.5 mm to 21.3 mm for a petrol fluid port and 23.6 mm to 24.5 mm for a diesel fluid port. When inserted in the main opening 206, the fuel nozzle may be securely held within the curved recessed slot 444, between the protruding portions 430 of the cover element 214, during refueling. A plurality of rib elements 608 in the main opening 206 may hold an external surface of the fuel nozzle positioned in the fluid port 200. The plurality of rib elements 608 may be equally or randomly spaced within the periphery of the main opening 206 to receive fuel nozzles of a designated range of diameters while stopping fuel nozzles with diameters exceeding the designated range of diameters.

When the cover element 214 is adjusted to open, the spring mechanism 202 may adjust from a first position (where the cover element 214 is closed) to a second position, where the door is adjusted to the open position. The pivotable spring arm 208 may bend towards the fixed spring arm, thereby producing a non-linear resistance force that allows the cover element to open with less applied force. In the open door position, the spring mechanism 202 and cover element 214 are positioned in a section above the first port axis 602. In this way, the spring mechanism 202 may be adjusted to move the cover element 214 between the closed and open positions.

Referring to FIG. 7, a plan view 700 of the fluid port 200 comprising the spring mechanism 202 coupled to the cover element 214, with the front cap removed is disclosed. The spring mechanism 202 is shown with the cover element 214 adjusted to the closed position. The spring mechanism 202 may be comprised of non-corrosive materials that withstand corrosive fluids such as urea and other fuel additives.

The fixed spring arm 210 is coupled to the pivotable spring arm 208 via a rod 702 extended through openings in the pivotable and fixed spring arms to form the spring hinge 212. As an example, the spring hinge 212 may allow translational movement of the pivotable and fixed spring arms, when the cover element 214 is adjusted between the closed and open positions. A distal end of the fixed spring arm 210 is coupled to the annular cap 224 to anchor the spring mechanism 202 to the fluid port 200. Each protruding element 415 of the protruding section 420 of the cover element 214 is held in a slot (such as slot 414 shown in FIGS. 4A-4B) in each of the first and second curved members 404-406 of the pivotable spring arm 208. In this way, the cover element 214 may be securely coupled to the spring mechanism 202. The hinges 216 on the cover element 214 may extend outward, with each hinge 216 adequately sized to snap into retention in a slot or pocket in the fluid port 200. As an example, the hinges 216 may allow translational movement of the cover element 214, when the door is adjusted between the closed and open positions.

When adjusted to the open position, a portion of the cover element 214 may be positioned adjacent to the outer face 304 of the circular ring 222. The cover element 214 may be held in the open position by a fuel nozzle inserted into the nozzle chamber during refueling. After refueling the fuel nozzle may be removed from the nozzle chamber to allow the fixed and pivotable spring arms to adjust the cover element 214 back to the closed position. When adjusted to the closed position, the cover element 214 seals off the fuel port to reduce or stop flow of fuel vapor from the fuel tank to the external atmosphere.

In this way, the spring mechanism 202 may be configured to adjust the cover element 214 between the closed and open positions while providing an adequate non-linear resistance force that allows the door to open with less applied force. Further, the spring mechanism 202 may be comprised of a non-corrosive material that allows the spring mechanism to function under a wide range of conditions without degradation.

Referring to FIG. 8, a cross sectional view of an alternative embodiment of a fluid port 800 comprising the spring mechanism 202 coupled to the cover element 214 is disclosed. The fluid port 800 includes a front cap 802 coupled to an annular rim 814 of a filler tube 804. When coupled, the front cap 802 may make face contact with the filler tube 804 along contact interface 816. The spring mechanism 202 including the cover element 214, are positioned in an interior chamber 808 of the port. The fluid port 800 is shown with the cover element 214 adjusted to a closed position.

As shown in FIG. 8, the fluid port 800 includes a main opening 805 that connects to a nozzle chamber 808 containing the spring mechanism 202 and cover element 214. The main opening 805 may include an internal wall 806 configured with a lip element 807 to guide a fuel nozzle or dispenser nozzle (not shown) into the opening. The cover element 214 may be securely mounted to the interior passage nozzle chamber 808 via hinges 216 that may be positioned in recessed slots (not shown) in the fluid port 800. A portion of the cover element 214 may be coupled to the pivotable spring arm 208 connected to the fixed spring arm 210. For example, a lower portion of the cover element 214 may include a pair of protruding elements 415, each protruding element 415 extending through a recessed slot 414 in each curved member 404-406 of the pivotable spring arm 208.

The fixed spring arm 210 may be coupled to the pivotable spring arm 208 via a rod (e.g., rod 702 shown in FIG. 7) that connects each of the curved members 404-406, and extends through a slot (not shown) in a front end of the fixed spring arm 210. When coupled to the fixed spring arm 210, the pivotable spring arm 208 may be adjustable between a first position (where the cover element 214 is in a closed door position) and a second position, where the cover element 214 is adjusted to an open position. The fixed spring arm 210 may be coupled to an annular ring 812, positioned downstream of the main opening 805. The annular ring 812 may include recessed slots 826 to receive the tabs 211-213 on the fixed spring arm 210. The tabs 211-213 may snap into retention with the recessed slots 826, thereby providing a means of securing the fixed spring arm 210 of the spring mechanism 202 to the fluid port 800. The annular element 824 has an opening 822 that leads to the inner passage 820 in the filler tube 804. An annular insert 810 having a circular section and a horizontal extended arm may be positioned between the cover element 214 and annular ring 812.

When mounted to the fluid port 800, the cover element 214 may be adjustable between the closed and open positions. The cover element 214 may be adjusted to the open position when a fuel nozzle or dispenser nozzle is inserted and extended through the main opening 805. The fuel nozzle or dispenser nozzle pushes the cover element 214 inward (in a direction of arrow 834), allowing the pivotable spring arm 208 to rotate about a spring hinge (e.g., spring hinge 212 shown in FIG. 2) connecting the fixed spring arm to pivotable spring arm. The pivotable spring arm 208 and fixed spring arm 210 may bend when adjusted, to produce a non-linear resistance force that enables the cover element 214 to open with less applied force. When adjusted to the open position, the inner face 428 of the cover element 214 may face a first wall 830 of the fueling port, and the outer face 432 of the cover element 214 may face a second wall 832 of the fueling port. The cover element 214 may be held in the open position by the fuel nozzle inside the main opening 805, to dispense fuel into a fuel tank, positioned in a direction shown by arrow 834.

The fuel nozzle may be removed from the fluid port 800 after refueling, to allow the cover element 214 to move back to the closed position. When adjusted to the closed position, the cover element 214 seals tightly against a periphery of the main opening 805 along contact interface 809. In this way, the cover element 214 closes off the main opening 805 to minimize or reduce flow of fuel vapor from the fluid port 800 to the atmosphere.

An example method may comprise: during insertion of the fuel nozzle or dispenser nozzle against the cover element 214 which is coupled to the nozzle chamber 808, pivotably rotating the cover element 214 to an open position; and applying a non-linear sealing force against the cover element 214 during the nozzle insertion, wherein the non-linear sealing force is generated from the combination of a first spring arm 208 having one end coupled to the nozzle chamber 808 and having another end coupled to a second spring arm 210 via a spring hinge, the second spring arm 210 having an end opposite the spring hinge which is coupled to the cover element 214 and also having a lower or an equivalent stiffness than the first spring arm 208. In a preceding example, the first spring arm 208 comprises two substantially parallel curved members 404-406 with a spacing there between. A further example may comprise: substantially inserting the second spring arm 210 between the two substantially curved members of the first spring arm 208 during the closing of the cover element 214 to reduce protrusion of the cover element 214 from an outer edge of the nozzle chamber 808.

Turning now to FIG. 9, an example graphic depicting a force displacement relationship for a spring mechanism (e.g., spring mechanism 202 shown in FIGS. 2-8) and a regular spring coupled to a cover element is shown. FIG. 9 depicts force versus displacement. The horizontal axis represents displacement of the spring mechanism and regular spring, and displacement increases from the left side of the plot to the right side of the plot. The vertical axis represents resistance force and the force increases in the direction of the vertical axis. Trace 902 represents a non-linear resistance force produced by the spring mechanism. Trace 904 represents a linear resistance force produced by the regular spring. Trace 906 represents a sealing force and trace 908 represents a pre-compressed displacement on the spring mechanism required to produce the sealing force 906.

The non-linear resistance force (902) produced by the spring mechanism initially increases rapidly with displacement prior to attaining the sealing force (906), and thereafter the resistance force (902) increases gradually with displacement. In this example, the spring mechanism may attain the sealing force (906) at the pre-compressed displacement. In contrast, the linear resistance force (904) produced by the regular spring increases linearly with displacement. The regular spring may require a larger displacement to attain the same sealing force 906. In other examples, a force larger than the sealing force 906 may be required to seal a door coupled to the regular spring. In this case, a larger applied force may be required to open the door since the resistance force produced by the regular spring increases linearly with displacement.

By providing a spring mechanism having a pivotable spring arm coupled to a cover element and a fixed spring arm, the both spring arms may bend to produce a non-linear resistance force that enables the door to open with less applied force. In this way, spring mechanism enables the cover element to open with ease while providing improved performance of the spring arms in corrosive environments.

In one example, a system may comprise: a bar linkage mechanism having a first spring arm coupled to a second pivotable spring arm via a living spring hinge, the second pivotable spring arm having a lower or an equivalent stiffness compared to the first spring arm; an element coupled to at least one of the arms of the bar linkage mechanism. In the preceding example additionally or optionally, the first spring arm includes a curved portion and a linear portion, the curved portion having the living spring hinge that couples to the second pivotable spring arm, and the linear portion having a recessed slot formed between a first and a second tab of the first spring arm. In any or all of the preceding examples, additionally or optionally, the element is a sealing door, a cover cap, a sliding door or swinging door. In any or all of the preceding examples, additionally or optionally, each of the first and second tab snap into retention with openings in an annular cap mounted in an interior chamber of a fluid port.

Furthermore, in any or all of the preceding examples, additionally or optionally, the second pivotable spring arm includes a pair of curved members, each member having a slot to receive a protruding portion of the element. In any or all of the preceding examples, additionally or optionally, the second pivotable spring arm includes a first curved member, a second curved member and a plurality of cross bracing members connected to each curved member. In any or all of the preceding examples, additionally or optionally, each of the first and second curved members have a convex shape on an outer surface having a recessed indentation. Any or all of the preceding examples, may additionally or optionally, comprise an opening formed between the plurality of cross bracing members and the first and second curved members.

In any or all of the further examples, additionally or optionally, the element is coupled to a fluid port via a pair of hinges, and further wherein the element is pivotable along a rotational axis through the hinges from a closed position to a plurality of open positions. In any or all of the preceding examples, additionally or optionally, an outer face of the element includes a curved portion positioned between two protruding elements, and having a radius of curvature adapted to receive an outer surface of a fuel nozzle. In any or all of the preceding examples, additionally or optionally, when the element is in a closed position, the second pivotable spring arm is adjusted to a first position, where the element is positioned parallel to a vertical port axis.

In another example, a refilling system of a vehicle may comprise: a fluid port having an interior passage and a main opening positioned forward of the interior passage; a sealing door pivotably coupled to the fluid port, downstream of the main opening, the door angled relative to a central port axis, where the main opening is only covered by the door and no additional caps; and a spring mechanism having a fixed spring arm coupled to the port and a pivotable spring arm coupled to the door, the fixed spring arm rotatably coupled to the pivotable spring arm via a spring hinge. In the preceding example, additionally or optionally, the pivotable spring arm has a lower or an equivalent stiffness compared to the fixed spring arm. In any or all of the preceding examples, additionally or optionally, the sealing door includes a pair of hinges that snap into retention with recessed openings in the port. In any or all of the preceding examples, additionally or optionally, when the sealing door is in a closed position, the fixed and pivotable spring arms are adjusted to a first position, where the door is positioned parallel to a vertical port axis.

Furthermore, in any or all of the preceding examples, additionally or optionally, when the sealing door is in a fully open position, the fixed and pivotable spring arms are adjusted to a second position, where the pivotable spring arm and door are positioned parallel to a horizontal port axis. In any or all of the preceding examples, additionally or optionally, a curved portion on the sealing door faces a second internal wall of the fueling port, the second internal wall positioned opposite to a first internal wall of the port. In any or all of the preceding examples, additionally or optionally, the spring hinge is positioned adjacent to a recessed aperture on the sealing door, when the door is adjusted to an open position.

An example system may comprise: a fuel passage coupled to a fuel tank of a vehicle; a fluid port including an opening fluidly coupled with the fuel passage; a sealing door rotatably coupled to the port, downstream of the opening relative to an exterior portion of the vehicle; and a first spring arm coupled to the port and rotatably coupled to a second pivotable spring arm, the pivotable spring arm coupled to the sealing door. In any or all of the preceding examples, additionally or optionally, the second pivotable spring arm bends towards the first spring arm when the sealing door is adjusted to an open position. In any or all of the preceding examples, additionally or optionally, the first spring arm and second pivotable spring arm move from a first position to a second position, the movement of the arms producing a non-linear resistance force.

An example method may comprise: during insertion of a dispenser nozzle against a sealing door which is coupled to a nozzle chamber, pivotably rotating the sealing door to an open position; and applying a non-linear sealing force against the sealing door during the nozzle insertion, wherein the non-linear sealing force is generated from the combination of a first spring arm having one end coupled to the nozzle chamber and having another end coupled to a second spring arm via a spring hinge, the second spring arm having an end opposite the spring hinge which is coupled to the sealing door and also having a lower or an equivalent stiffness than the first spring arm. In a preceding example, the first spring arm comprises two substantially parallel curved members with a spacing there between. A further example may comprise: substantially inserting the second spring arm between the two substantially curved members of the first spring arm during the closing of the sealing door to reduce protrusion of the sealing door from an outer edge of the nozzle chamber.

FIGS. 2-8 show example configurations with relative positioning of the various components of spring mechanism, sealing door and fueling device. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A refilling system of a vehicle comprising:
a fluid port having an interior passage and a main opening positioned forward of the interior passage;
a sealing door pivotably coupled to the fluid port, downstream of the main opening, the sealing door angled relative to a central port axis, where the main opening is only covered by the sealing door and no additional caps; and
a spring mechanism having a fixed spring arm coupled to the fluid port and a pivotable spring arm coupled to the sealing door, the fixed spring arm rotatably coupled to the pivotable spring arm via a spring hinge.

2. The system of claim 1, wherein the sealing door includes a pair of hinges that snap into retention with recessed openings in the fluid port.

3. The system of claim 1, wherein when the sealing door is in a closed position, the fixed and pivotable spring arms are adjusted to a first position, where the sealing door is positioned parallel to a vertical port axis.

4. The system of claim 1, wherein when the sealing door is in a fully open position, the fixed and pivotable spring arms are adjusted to a second position, where the sealing door is positioned parallel to a horizontal port axis.

5. The system of claim 4, wherein a curved portion on the sealing door faces a second internal wall of the fluid port, the second internal wall positioned opposite to a first internal wall of the fluid port.

6. A system comprising:
a fuel passage coupled to a fuel tank of a vehicle;
a fluid port including an opening fluidly coupled with the fuel passage;
a sealing door rotatably coupled to the fluid port, downstream of the opening relative to an exterior portion of the vehicle; and
a first spring arm coupled to the fluid port and rotatably coupled to a second pivotable spring arm, the second pivotable spring arm coupled to the sealing door.

7. The system of claim 6, wherein the first spring arm and second pivotable spring arm move from a first position to a second position when the sealing door is adjusted to an open position, the movement of the spring arms producing a non-linear resistance force.

8. A method comprising:
during insertion of a dispenser nozzle against a sealing door which is coupled to a nozzle chamber, pivotably rotating the sealing door to an open position; and
applying a non-linear sealing force against the sealing door during the nozzle insertion, wherein the non-linear sealing force is generated from a combination of a first spring arm having one end coupled to the nozzle chamber and having another end coupled to a second spring arm via a spring hinge, the second spring arm having an end opposite the spring hinge which is coupled to the sealing door and also having a lower stiffness than the first spring arm.

9. The method of claim 8, wherein the first spring arm comprises two substantially parallel curved members with a spacing there between.

10. The method of claim 9, further comprising substantially inserting the second spring arm between the two substantially curved members of the first spring arm during a closing of the sealing door to reduce protrusion of the sealing door from an outer edge of the nozzle chamber.

* * * * *